United States Patent [19]

Alvarez

[11] Patent Number: 5,131,736
[45] Date of Patent: Jul. 21, 1992

[54] SOLID COLLOIDAL OPTICAL WAVELENGTH FILTER

[75] Inventor: Joseph L. Alvarez, Boulder, Colo.

[73] Assignee: The United States of America as represented by the Department of Energy, Washington, D.C.

[21] Appl. No.: 530,673

[22] Filed: May 30, 1990

[51] Int. Cl.$^5$ .............................................. G02B 5/24
[52] U.S. Cl. ............................ 359/886; 356/334; 359/885; 359/569; 359/573; 359/900
[58] Field of Search .......... 350/312, 314, 319, 162.11, 350/162.24, 362, 320; 264/4.1, 4.4, 5, 9; 356/331, 332, 333, 334, 326, 328

[56] References Cited

U.S. PATENT DOCUMENTS

| | | |
|---|---|---|
| 3,341,274 | 9/1967 | Marks . |
| 3,711,189 | 1/1973 | Novotny et al. ............... 350/312 |
| 4,078,856 | 3/1978 | Thompson et al. . |
| 4,099,854 | 7/1978 | Decker et al. .................. 350/312 |
| 4,252,969 | 2/1981 | Broering et al. ................ 264/9 |
| 4,261,653 | 4/1981 | Goodrich . |
| 4,309,080 | 1/1982 | Hanchard et al. ............... 350/312 |
| 4,451,412 | 5/1984 | Loiseaux et al. . |
| 4,453,805 | 6/1984 | Ashkin et al. .............. 350/162.24 |
| 4,627,689 | 12/1986 | Asher ............................ 350/362 |
| 4,632,517 | 12/1986 | Asher ............................ 350/362 |

Primary Examiner—Loha Ben
Attorney, Agent, or Firm—Mark P. Dvorscak; Robert J. Fisher; William R. Moser

[57] ABSTRACT

A solid colloidal optical wavelength filter includes a suspension of spherical particles dispersed in a coagulable medium such as a setting plastic. The filter is formed by suspending spherical particles in a coagulable medium; agitating the particles and coagulable medium to produce an emulsion of particles suspended in the coagulable medium; and allowing the coagulable medium and suspended emulsion of particles to cool.

10 Claims, 3 Drawing Sheets

SOLID COLLOIDAL OPTICAL WAVELENGTH FILTER

CONTRACTUAL ORIGIN OF THE INVENTION

The United States Government has rights in this invention pursuant to Contract No. DE-AC07-76ID01570 between the U.S. Department of Energy and EG & G Idaho, Inc.

BACKGROUND OF THE INVENTION

The present invention relates generally to techniques and methods to filter optical wavelengths for spectroscopy, protection from intense radiation, monochromatizing, and analyzing optical radiation, and more particularly to a solid colloidal rejection filter and a method for constructing a solid colloidal rejection filter.

Wavelength selection and wavelength selection elements are necessary in many optical measurements and techniques. Common elements are color filters and diffraction gratings. Color filters are usually broad band and of low efficiency. The best are multilayer dielectric filters with narrow band pass of about 7.5 nm but with maximum throughputs of less than 50%.

Diffraction gratings which disperse the wavelengths have the added advantage of being tunable and useful for low intensity light. However, diffraction gratings are necessarily bulky, fragile, and require multiple gratings to reject high intensity scattered light.

Colloidal optical wavelength filters have been developed that are wavelength selective by Bragg diffraction and are highly efficient with a narrow bandpass. Filters of this type have applications in spectroscopy, radiation monitoring, and laboratory techniques. These colloidal filters are suspensions of micro-spheres in liquids. U.S. Pat. No. 4,632,517 to Asher discloses such a filtering device having a crystalline colloidal structure formed by dispersing electrically charged particles, such as polystyrene spheres, within an appropriate liquid. However, these filters are short-lived and suffer from environmental limitations that are a characteristic of the liquid and the method of containment. In the field, such filters are inherently fragile. Use of liquid, as the suspending medium causes the further problem of thermal lensing with intense radiation, and the properties of the liquid change as ions leach from the containment walls of the filter. An additional problem is that the refractive index of the filter is limited by the requirements of the ionic strength of the suspending liquid.

Accordingly, an object of this invention is to provide new and improved methods and apparatus for filtering optical wavelengths for purposes of spectroscopy, protection from intense radiation, and monochromatizing.

Another object of this invention is to provide new and improved methods and apparatus for analyzing optical radiation.

Yet another object of this invention is to provide new and improved methods and apparatus for filtering optical wavelengths in which the filter has a constant refractive index.

Still another object of this invention is to provide new and improved methods and apparatus for filtering optical wavelengths that have fewer environmental limitations, possess longer lives, are less fragile and can be used in the field.

A further of object of this invention is to provide new and improved methods and apparatus for filtering optical wavelengths that maintains constant filter properties.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This invention contemplates a solid colloidal optical wavelength filter having a suspension of spherical particles dispersed in a coagulable medium. The spherical particles can be liquid, solidifiable liquid, or solid. The liquid spheres in turn, may comprise water. The coagulable medium can be a setting plastic such as epoxy. One other aspect of the invention is a method for constructing the solid filter which comprises suspending spherical particles in a coagulable medium; agitating the particles and coagulable medium to produce an emulsion of particles suspended in the coagulable medium; allowing the coagulable medium and suspended emulsion of particles to cool;

and then allowing the coagulable medium and suspended emulsion of particles to cool so that a solid colloidal wavelength filter is formed. The filter can be used to limit the transmission of a narrow wavelength band. Since the wavelength is Bragg diffracted, the filter can also be used as a slitless monochromator as can other non-solid colloidal filters.

Brief Description or the Drawings

The above-mentioned and other features of the invention will become more apparent and best understood, together with the description, by reference to the accompanying drawings, in which.

DETAILED DESCRIPTION OF THE INVENTION

Figure 1:
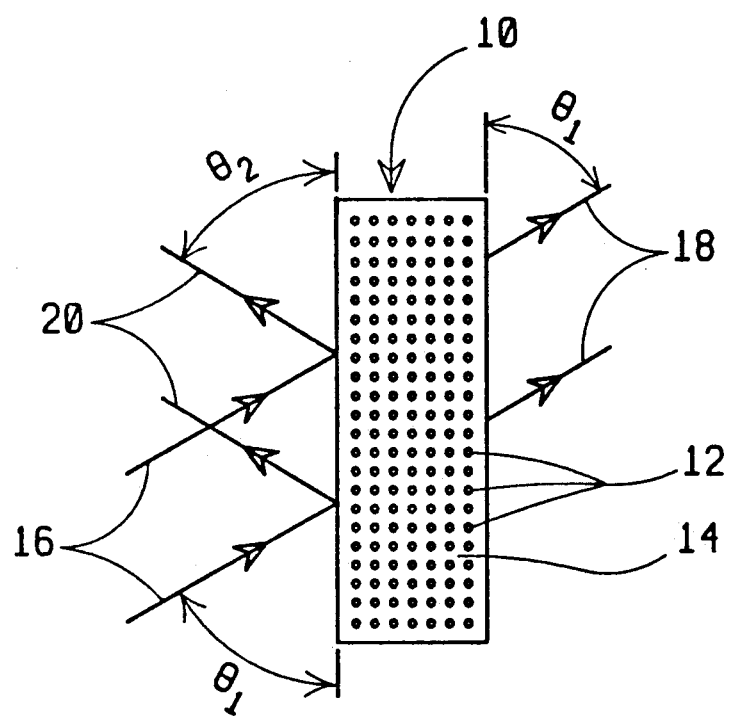
FIG. 1 shows Bragg diffraction filtering obtained by an embodiment of the present invention.
Figure 2A:
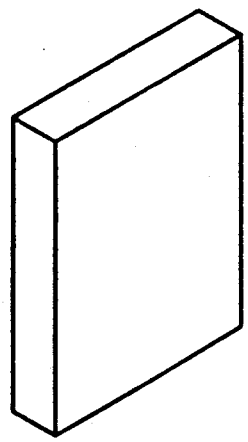
FIGS. 2A-2D show four shapes of a solid crystalline colloidal filter.
Figure 2B:
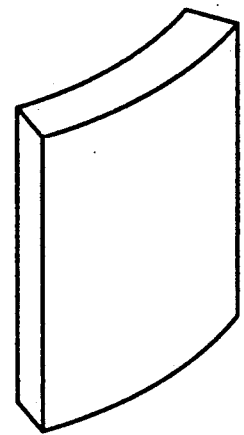
Figure 2C:
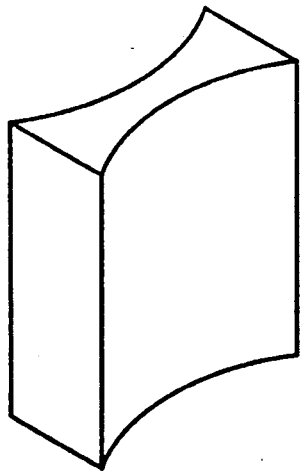
Figure 2D:
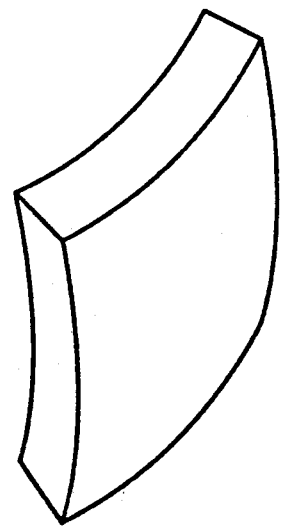

Referring to FIG. 1, Bragg diffraction filtering is shown by a preferred embodiment of the present invention. A solid colloidal filter 10 has a dispersion of particles Or dispersoids 12 in a coagulable medium 4. Incoming rays 16 are incident on the filter 10 at an angle $\Theta_1$, transmitted rays 18 pass through the filter 10 at a substantially equal angle $\Theta_1$, and reflected rays 20 are diffracted from the filter 10 at an angle $\Theta_2$.

The dispersoids 12 can be liquid, solidifiable liquid, or solid spheres on which an electrical charge resides. Examples of liquid dispersoids are water, salt solutions, mineral acids, or other polar liquids which are not soluble in the coagulable medium. Solidifiable liquids which can be used as dispersoids include metal alkoxides and silicon alkoxides. Solid dispersoid spheres may be oxide powders such as ceramics and glasses, or non-oxide ceramics including, but not limited to, silicon, silicon nitride, boron nitride, silicon carbide, or boron carbide. Metal powders including but not limited to copper, aluminum, tin, or steel, may also be used as dispersoids.

A surfactant is used for causing and stabilizing the dispersion. The surfactant can be general or particular to the chosen dispersoid. Liquid dispersoids are commonly established using soaps, detergents, or lethicins. Ceramic powders and glasses may be dispersed using mixtures of triglycerides, triglycerides and alcohols, or triglycerides and aldehydes. Metal powders have been dispersed using mixtures of triglycerides, alcohols, and organic acids.

The coagulable medium 14 is preferably a setting plastic or epoxy. Examples of setting plastics suitable for establishing the crystalline colloids in the liquid state, and then polymerizing to a solid state by addition of a peroxide include styrene, vinyltoluene, and methacrylate. These examples and their setting agent are not limiting types of setting plastics. The electrical charge on the dispersoids 12 is of sufficient degree so that the distribution of the dispersoids 12 in the coagulable medium 14 forms a crystalline colloidal array prior to the solidification of the coagulable medium 14, and in this manner, a solid crystalline colloidal array filter is formed. This technique for forming a solid colloidal filter is not limited to any polymerization or solidification technique, nor to any method of dispersing the liquid to form an emulsion of water suspended in the coagulable medium.

The above examples provide a particular filter for a particular wave length band, $\lambda$, by a combination of size of the powder, refractive index of the mixture, n, and angle of incidence on the crystalline plane, $\Theta$, within the suspension in accordance with the well-known Bragg formula:

$$M\lambda = 2nd \sin\Theta$$

The factor M is the diffraction order and d is the perpendicular distance between adjacent crystalline planes.

The characteristics of the filter can be adjusted by adjusting the constituents of the dispersoids or the setting plastic to alter the refractive index of either the liquid or solid phase of the filter. For example, the size of the dispersoids and/or the concentration of the dispersoids in the plastic can be adjusted to obtain the desired filter characteristics. Techniques may also be employed to alter the filter spatially to obtain nonlinear optical characteristics. These techniques may include, but are not limited to: heating one side of the filter during setting; causing another material or chemical to diffuse into the solidifying or solidified filter from one direction; layering different plastics in which the dispersoids are suspended; or layering different concentrations of the dispersoids.

Possible shapes for the filter 10 are illustrated in FIG. 2. FIG. 2A is a planar shape having essentially parallel sides, and represent the basic use for the invention. The capability of forming a solid colloidal filter allows casting into other shapes, or reforming after casting in a planar shape. Additional shapes for focusing or diffusing the filtered rays are shown in FIGS. 2B, 2C, and 2D. FIG. 2B represents a simple focusing element which could be used to filter and focus the image of a slit. FIG. 2C represents a dispersing element which could be used to filter and disperse the image of a slit. FIG. 2D represents a focusing element which could be used to filter and focus the image of a point source of light. The shapes illustrated in FIG. 2 are merely representative of those which can be employed. Many shapes are possible, depending on the particular measurement desired from the filter.

Figure 3:
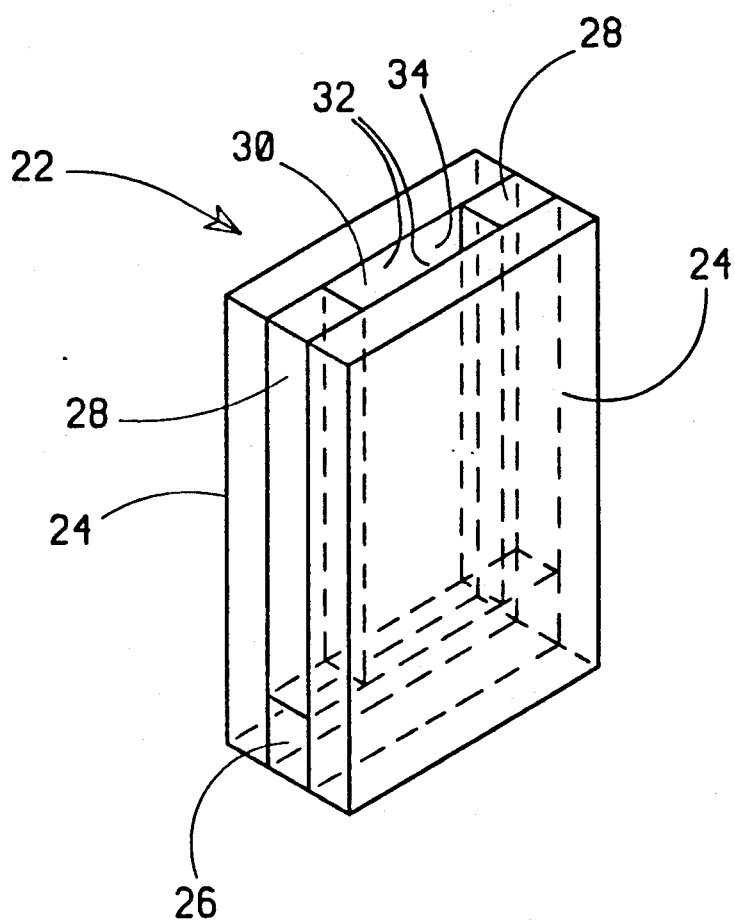
FIG. 3 shows a form for constructing a solid crystalline colloidal filter as a planar shape.

A form 22 for constructing a planar-shaped solid colloidal filter is shown in FIG. 3. The form 22 can be plastic, glass, or other suitable material, and includes sides 24, a bottom 26, and ends 28 held together with clamping devices, or with glue if a permanent filter is desired. The sides, ends, and bottom form a cavity 30 having parallel sides 32 and a top opening 34. To construct the solid colloidal filter 10, microdroplets of water are suspended in a setting plastic. The method of suspending the water droplets is that of standard emulsion techniques well known in the art. A surfactant must be mixed with the water to from a micell in the plastic. The surfactant, water, and plastic mixture are then introduced into the cavity 30 of form 22 through the opening 34, and agitated to completely and evenly disperse the water and to produce an emulsion of water droplets suspended in the setting plastic. Agitation can be accomplished by shaking, blending, or ultrasonics. Preferably, a specially tuned ultrasonic device is used to attain the correct droplet size and their proper dispersion in the plastic. The size and electric charge of the droplet will be determined by the surfactant used and the ionic strength of the water. Following agitation, the setting plastic and suspended emulsion of water droplets is cooled and allowed to set, or is caused to set by addition of a setting agent. In this manner, a solid colloidal optical wavelength filter is constructed. The attainment of a particular crystal structure will depend upon the setting properties of the plastic, its viscosity, and the interfacial tension of the emulsion.

Alternatively, ceramic or other spherical particles of monodisperse size can be suspended in the setting plastic. The forming of ceramic particles, and the method of dispersion in the setting plastic is an established technique known to practitioners in the ceramics industry.

There has thus been shown an improved means for constructing a solid colloidal optical wavelength filter. The present invention overcomes limitations of prior art non-solid filters. A solid colloidal filter removes containment problems manifested by liquid colloids, and since a solid filter is less fragile than liquid filters, it can be used in harsher environments such as the field. Additionally, since ions do not leach from a solid filter, the filter properties do not change.

The foregoing description of a preferred embodiment of the invention has been presented for purposes of illustration and desctiption. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property or privilege is claimed are defined as follows:

1. A solid colloidal optical wavelength filter comprising:
    electrically-charged dispersoids in an ordered crystalline array within a coagulable medium, the coagulable medium being capable of producing a solid colloidal array for Bragg diffraction.

2. The solid colloidal filter of claim 1, wherein the dispersoids are liquid droplets.

3. The solid colloidal filter of claim 2, wherein the liquid droplets are droplets of water.

4. The solid colloidal filter of claim 1, wherein the dispersoids are a solidifiable liquid.

5. The solid colloidal filter of claim 1, wherein the dispersoids are solid particles.

6. The solid coloidal filter of claim 1, wherein the coagulable medium is epoxy.

7. The solid colloidal filter of claim 1, wherein the coagulable medium is a setting plastic capable of establishing the dispersoids in a liquid state and then polymerizing to a solid state.

8. A method for producing a solid colloidal optical wavelength filter for Bragg diffraction comprising:
   suspending spherical particles in a coagulable medium capable of establishing the particles in a liquid state;
   agitating the particles and coagulable medium to produce an emulsion of particles suspended in the coagulable medium;
   polymerizing the coagulable medium and suspended emulsion of particles to a solid state;
   whereby a solid colloidal optical wavelength filter is constructed.

9. The method of claim 8, wherein the spherical particles are suspended in the presence of a surfactant.

10. A method for producing a solid colloidal optical wavelength filter comprising:
    suspending microdroplets of water in a setting plastic in the presence of a surfactant;
    agitating the setting plastic and water droplets to produce an emulsion of water droplets suspended in the setting plastic;
    polymerizing the plastic and suspended emulsion of water droplets to form a solid colloidal optical wavelength filter.

* * * * *